(12) United States Patent
Wei et al.

(10) Patent No.: US 12,437,753 B2
(45) Date of Patent: Oct. 7, 2025

(54) METHOD AND APPARATUS WITH KEYWORD DETECTION

(71) Applicant: Samsung Electronics Co., Ltd., Suwon-si (KR)

(72) Inventors: Bo Wei, Xi'an (CN); Meirong Yang, Xi'an (CN); Tao Zhang, Xi'an (CN); Xiao Tang, Xi'an (CN); Xing Huang, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 17/698,368

(22) Filed: Mar. 18, 2022

(65) Prior Publication Data

US 2022/0301550 A1 Sep. 22, 2022

(30) Foreign Application Priority Data

Mar. 18, 2021 (CN) .......................... 202110291276.X
Dec. 20, 2021 (KR) .......................... 10-2021-0182848

(51) Int. Cl.
*G10L 15/00* (2013.01)
*G10L 15/02* (2006.01)
(Continued)

(52) U.S. Cl.
CPC .............. *G10L 15/08* (2013.01); *G10L 15/02* (2013.01); *G10L 25/30* (2013.01); *G10L 2015/088* (2013.01)

(58) Field of Classification Search
CPC ....... G10L 19/005; G10L 19/00; G10L 19/02; G10L 25/27; G10L 25/30; G10L 15/16;
(Continued)

(56) References Cited

U.S. PATENT DOCUMENTS 9,672,817 B2 * 6/2017 Yong ...................... G10L 15/14
10,257,314 B2 4/2019 Agrawal et al.
(Continued)

FOREIGN PATENT DOCUMENTS

CN 105679316 A 6/2016
CN 106782536 A 5/2017
(Continued)

OTHER PUBLICATIONS

Chinese Office Action issued on Sep. 27, 2023, in counterpart Chinese Patent Application No. 202110291276.X (3 pages in English, 9 pages in Chinese).
(Continued)

*Primary Examiner* — Vu B Hang
(74) *Attorney, Agent, or Firm* — NSIP Law (57) ABSTRACT

A processor-implemented method with keyword detection includes: receiving at least a portion of a voice signal input by a user; extracting a voice feature of the voice signal; inputting an abstract representation sequence of a preset keyword and the voice feature to an end-to-end keyword detection model, and determining a result on whether the preset keyword is present in the voice signal output from the keyword detection model, wherein the keyword detection model predicts whether the preset keyword is present in the voice signal by: determining an abstract representation sequence of the voice signal, based on the voice feature and the abstract representation sequence of the preset keyword; predicting position information of the preset keyword in the voice signal based on the abstract representation sequence of the voice signal; and predicting whether the preset keyword is present in the voice signal, based on the abstract representation sequence of the voice signal and the position information.

19 Claims, 7 Drawing Sheets

(51) Int. Cl.
*G10L 15/08* (2006.01)
*G10L 25/30* (2013.01)

(58) Field of Classification Search
CPC ......... G10L 15/07; G10L 15/20; G10L 15/22; G10L 15/26; G10L 15/30; G10L 15/02; G10L 15/08; G10L 15/063; G10L 15/12; G10L 25/87; G10L 15/04; G10L 15/14; G10L 15/197; G10L 15/1815; G10L 15/187; G10L 2015/0631; G10L 15/065
See application file for complete search history.

(56) References Cited

U.S. PATENT DOCUMENTS

| | | | |
|---|---|---|---|
| 10,984,783 B2 * | 4/2021 | Chen | G10L 15/1822 |
| 2019/0318727 A1 | 10/2019 | Lopez Moreno et al. | |
| 2020/0126556 A1 | 4/2020 | Mosayyebpour et al. | |
| 2020/0410983 A1 | 12/2020 | Mohajer et al. | |
| 2021/0056961 A1 | 2/2021 | Ding et al. | |

FOREIGN PATENT DOCUMENTS

| | | |
|---|---|---|
| CN | 107665705 A | 2/2018 |
| CN | 109065032 A | 12/2018 |
| CN | 109147766 A | 1/2019 |
| CN | 109545190 A | 3/2019 |
| CN | 110119765 A | 8/2019 |
| CN | 110288980 A | 9/2019 |
| CN | 110334244 A | 10/2019 |
| CN | 110767223 A | 2/2020 |
| CN | 110827806 A | 2/2020 |
| CN | 111009235 A | 4/2020 |
| CN | 111144127 A | 5/2020 |
| CN | 111508493 A | 8/2020 |
| CN | 111933129 A | 11/2020 |
| CN | 112151015 A | 12/2020 |
| CN | 112309398 A | 2/2021 |
| KR | 10-2020-0017139 A | 2/2020 |

OTHER PUBLICATIONS

Zhao, Zeyu, et al. "End-to-End Keyword Search Based on Attention and Energy Scorer for Low Resource Languages." *Interspeech*, Shanghai, China Oct. 25-20, 2020 (5 pages in English).

* cited by examiner

METHOD AND APPARATUS WITH KEYWORD DETECTION

CROSS-REFERENCE TO RELATED APPLICATIONS

This application claims the benefit under 35 USC § 119(a) of Chinese Patent Application No. 202110291276.X filed on Mar. 18, 2021 in the China National Intellectual Property Administration, and Korean Patent Application No. 10-2021-0182848 filed on Dec. 20, 2021 in the Korean Intellectual Property Office, the entire disclosures of which are incorporated herein by reference for all purposes.

BACKGROUND

1. Field

The following description relates to a method and apparatus with keyword detection.

2. Description of Related Art

A virtual voice assistant is used in devices that implement human-computer interaction such as car navigation, a smart home, a smartphone, a smart speaker, and the like. One of the important functions of the virtual voice assistant is a voice wake-up function that activates a device in sleep mode when a predetermined wake-up word input by a user is identified, and starts a service by shifting from the sleep mode to an active mode. In addition, there are other application scenarios (for example, voice search) that identify whether a predetermined word is included in a voice signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with keyword detection includes: receiving at least a portion of a voice signal input by a user; extracting a voice feature of the voice signal; inputting an abstract representation sequence of a preset keyword and the voice feature to an end-to-end keyword detection model, and determining a result on whether the preset keyword is present in the voice signal output from the keyword detection model, wherein the keyword detection model predicts whether the preset keyword is present in the voice signal by: determining an abstract representation sequence of the voice signal, based on the voice feature and the abstract representation sequence of the preset keyword; predicting position information of the preset keyword in the voice signal based on the abstract representation sequence of the voice signal; and predicting whether the preset keyword is present in the voice signal, based on the abstract representation sequence of the voice signal and the position information.

The keyword detection method may be performed in real-time for at least a portion of the voice signal input by the user.

The preset keyword may include either one or both of a keyword defined by the user and a preset keyword preset by a system or an application.

The determining of the abstract representation sequence of the voice signal, based on the voice feature and the abstract representation sequence of the preset keyword may include determining the abstract representation sequence of the voice signal by combining the voice feature with the abstract representation sequence of the preset keyword through an attention mechanism.

The predicting of whether the preset keyword is present in the voice signal, based on the abstract representation sequence of the voice signal and the position information may include: determining an abstract representation sequence of a portion comprising the preset keyword in the voice signal, based on the abstract representation sequence of the voice signal and the position information; and predicting whether the preset keyword is present in the voice signal by combining the abstract representation sequence of the preset keyword with the abstract representation sequence of the portion comprising the preset keyword in the voice signal through an attention mechanism.

The keyword detection model may include a voice encoder used for predicting an abstract representation sequence of a voice signal, the voice encoder may include a plurality of submodules connected in series, and each of the submodules may input the abstract representation sequence of the preset keyword to a hidden layer abstract representation sequence of the voice signal through the attention mechanism.

The abstract representation sequence of the preset keyword may be generated by a pre-trained keyword encoder based on a phone sequence of the preset keyword.

The keyword detection model may be determined by multi-objective joint training, and a multi-objective may include predicting a phone sequence corresponding to the voice signal, predicting a position of a keyword in the voice signal, and predicting whether the keyword is present in the voice signal.

An objective loss function corresponding to an object for predicting the position of the keyword in the voice signal may be based on a diagonal pattern of an attention matrix.

The method may include: waking up a current electronic device in response to the result output from the keyword detection model indicating that the preset keyword is present in the voice signal; and/or outputting the result and the position information.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with keyword detection includes: one or more processors; and a memory storing instructions that, when executed by the one or more processors, configure the one or more processors to perform any one, any combination, or all operations and methods described herein.

In another general aspect, an apparatus with keyword detection includes: a receiver configured to receive at least a portion of a voice signal input by a user; one or more processors configured to: extract a voice feature of the voice signal; and input an abstract representation sequence of a preset keyword and the voice feature to an end-to-end keyword detection model, and determine a result on whether the preset keyword is present in the voice signal output from the keyword detection model, wherein the keyword detection model predicts whether the preset keyword is present in the voice signal by: determining an abstract representation sequence of the voice signal, based on the voice feature and the abstract representation sequence of the preset keyword; predicting position information of the preset keyword in the voice signal based on the abstract representation sequence of the voice signal; and predicting whether the preset keyword is present in the voice signal, based on the abstract representation sequence of the voice signal and the position information.

The keyword detection apparatus may process at least a portion of the voice signal input by the user in real-time.

For the determining of the abstract representation sequence of the voice signal, the one or more processors may be configured to determine the abstract representation sequence of the voice signal by combining the voice feature with the abstract representation sequence of the preset keyword through an attention mechanism.

The predicting of whether the preset keyword is present in the voice signal based on the abstract representation sequence of the voice signal and the position information may include: determining an abstract representation sequence of a portion comprising the preset keyword in the voice signal based on the abstract representation sequence of the voice signal and the position information; and predicting whether the preset keyword is present in the voice signal by combining the abstract representation sequence of the preset keyword with the abstract representation sequence of the portion comprising the preset keyword in the voice signal through an attention mechanism.

In another general aspect, a processor-implemented method with keyword detection includes: determining text of a keyword; determining a phone sequence of the text; determining whether the keyword satisfies a preset condition based on either one or both of the text and the phone sequence; and determining an abstract representation sequence of the keyword by inputting the phone sequence to a pre-trained keyword encoder, in response to the keyword satisfying the preset condition.

The method may include: receiving at least a portion of a voice signal input by a user; extracting a voice feature of the voice signal; and inputting the abstract representation sequence of the keyword and the voice feature to an end-to-end keyword detection model; and determining a result on whether the keyword is present in the voice signal output from the keyword detection model.

The text of the keyword may be input by a user.

The determining of whether the keyword satisfies the preset condition may include determining whether a number of syllables of the text is greater than or equal to a predetermined number.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first," "second," and the like are used to explain various members, components, regions, layers, or sections, these members, components, regions, layers, or sections are not limited to such terms. Rather, these terms are used only to distinguish one member, component, region, layer, or section from another member, component, region, layer, or section. For example, a first member, component, region, layer, or section referred to in examples described herein may also be referred to as a second member, component, region, layer, or section without departing from the teachings of the examples.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Figure 1:
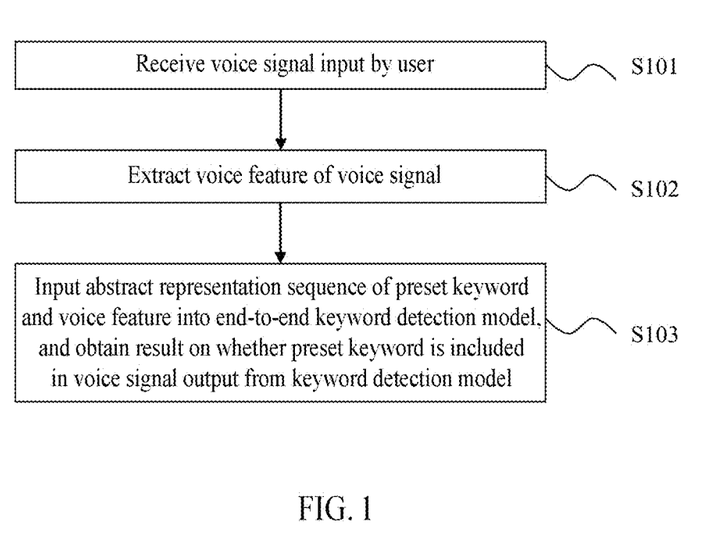
FIG. 1 is a flowchart illustrating example of a keyword detection method.

FIG. 1 is a flowchart illustrating a keyword detection method according to an example embodiment. The keyword detection method may be performed by an electronic device. For example, the keyword detection method may be performed by an application installed on the electronic device, or a program implemented in an operating system of the electronic device. For example, the electronic device may be an electronic device that may receive a voice command, such as a mobile communication device (for example, a smartphone), a smart wearable device (for example, a smartwatch), a personal computer, a tablet computer, a game console, a digital multimedia player, a smart home appliance, and the like.

Referring to FIG. 1, in operation S101, a voice signal input by a user may be received. In operation S101, the voice signal may be a voice signal for an entire section from a start to an end of utterance of the user, and may be at least a portion of the entire section input by the user.

For example, the voice signal may be recorded in real time by voice recording hardware of the electronic device. For example, the voice signal may be a single-channel audio stream of which a sampling frequency is 16,000 Hz.

In operation S102, the voice signal may extract a voice feature.

For example, the voice feature may be various appropriate types of voice features, which are not limited in the present disclosure. For example, the voice feature may be a Mel-scale frequency cepstral coefficients (MFCC) feature, a Mel-Filter Bank feature, or a typical voice feature, and a combination of various voice features.

For example, the voice feature may be a matrix in a form of $t_0*f$, and $t_0$ may represent the number of frames of a voice feature sequence, a frame may represent continuous time of sampling, and f may represent a dimension of the voice feature for each frame.

In addition, for example, to improve an operation speed while maintaining effective information, the extracted voice feature may be pre-processed, and the pre-processed voice feature may be used in operation S103. For example, the preprocessing may include overlapping frame and downsampling, and other types of preprocessing may be included. Here, overlapping frame may refer to connecting n consecutive frames into one large frame, and downsampling may refer to scheduling one frame per m frames. After the preprocessing including overlapping frame and downsampling is performed, a matrix form of the voice feature may be t1*f1, and here, $t_1=t0/m$ and $f_1=f*n$. In addition, for example, the voice feature may be used in operation S103 by being combined with a position coding vector.

In operation S103, the voice feature and an abstract representation sequence of a preset keyword may be input to an end-to-end keyword detection model, and a result on whether the preset keyword is included in the voice signal output from the keyword detection model may be obtained. That is, whether the preset keyword is included in the voice signal may be predicted through the end-to-end keyword detection model.

For example, the keyword detection model may predict whether the preset keyword is included in the voice signal by the following method: obtaining an abstract representation sequence of the voice signal, based on the voice feature and the abstract representation sequence of the preset keyword, and then, predicting position information of the preset keyword in the voice signal based on the abstract representation sequence of the voice signal, and predicting whether the preset keyword is included in the voice signal, based on the abstract representation sequence of the voice signal and the position information.

For example, the result on whether the preset keyword is included in the voice signal may be two types of classification results that a probability that the preset keyword is included in the voice signal and a probability that the preset keyword is not included in the voice signal or, a case that the preset keyword is included in the voice signal or a case that the preset keyword is not included.

For example, the preset keyword may include at least one of a keyword defined by the user and a preset keyword preset by a system or an application. For example, the preset keyword may include various forms of keywords, such as a wake-up word to wake-up a current electronic device. For example, the preset keyword may include the wake-up word defined by the user. In an example, there may be the following application scenario: in response to an utterance of a voice command (that is, the voice signal) including a wake-up keyword (that is, the preset keyword) when the electronic device is in sleep mode, operation S101 may be performed.

In an example embodiment, an operation of obtaining the abstract representation sequence of the voice signal, based on the voice feature and the abstract representation sequence of the preset keyword may include an operation of obtaining the abstract representation sequence of the voice signal by combining the voice feature with the abstract representation sequence of the preset keyword through an attention mechanism. That is, the present disclosure may use the attention mechanism in a process of recognizing voice from text.

For example, the keyword detection model may include a voice encoder configured to predict an abstract representation sequence of a voice signal. For example, the voice encoder may be a self-attention voice encoder.

For example, the voice encoder may be identical to an acoustic model, may receive a voice feature as an input, and may calculate a post-probability of phoneme classification per frame. The calculation may be represented by a matrix of $t_1*p$, where $t_1$ may represent time dimension divided by frames, p may represent the total number of phonemic types and other miscellaneous non-phonemic classification items such as an empty state, a blank, start and end marks, and a noise mark. The voice encoder may be implemented in various forms such as a deep neural network (DNN), a convolutional neural network (CNN), a recurrent neural network (RNN), and transformer autoencoders. For example, the voice encoder may be configured based on a transformer self-attention feature extractor.

In addition, the voice encoder may pay more attention to a portion in which the preset keyword may be included in a voice sequence by inputting the abstract representation sequence of the preset keyword to the attention mechanism.

For example, a matrix form of the attention mechanism may be represented as follows:

$$Z = \text{softmax}\left(\frac{F(Q, K)}{\sqrt{d_k}}\right)V$$

Here, Q may denote a query matrix having a form of $t_q*f_q$, K may denote a key matrix having a form of $t_k*f_k$, and F( ) may denote a vector similarity measurement function used for comparing similarities in a row vector of the query matrix and a row vector of the key matrix, and thus, $f_q=f_k$. While an output of the F( ) function is a matrix having a form of $t_q*t_k$, a predetermined implementation of the F( ) function may be a vector dot, a cosine similarity, or a multi-layer perceptron (MLP), or other functions, and the examples are not limited thereto. $d_k$ may represent a dimension of the row vector of the key matrix, the softmax( ) function may be used for normalizing an attention weight calculated by Q and K, V may denote a value matrix having a form of $t_v*f_v$, and Z may denote a result matrix of the attention mechanism having a form of $t_q*f_v$.

Figure 2:
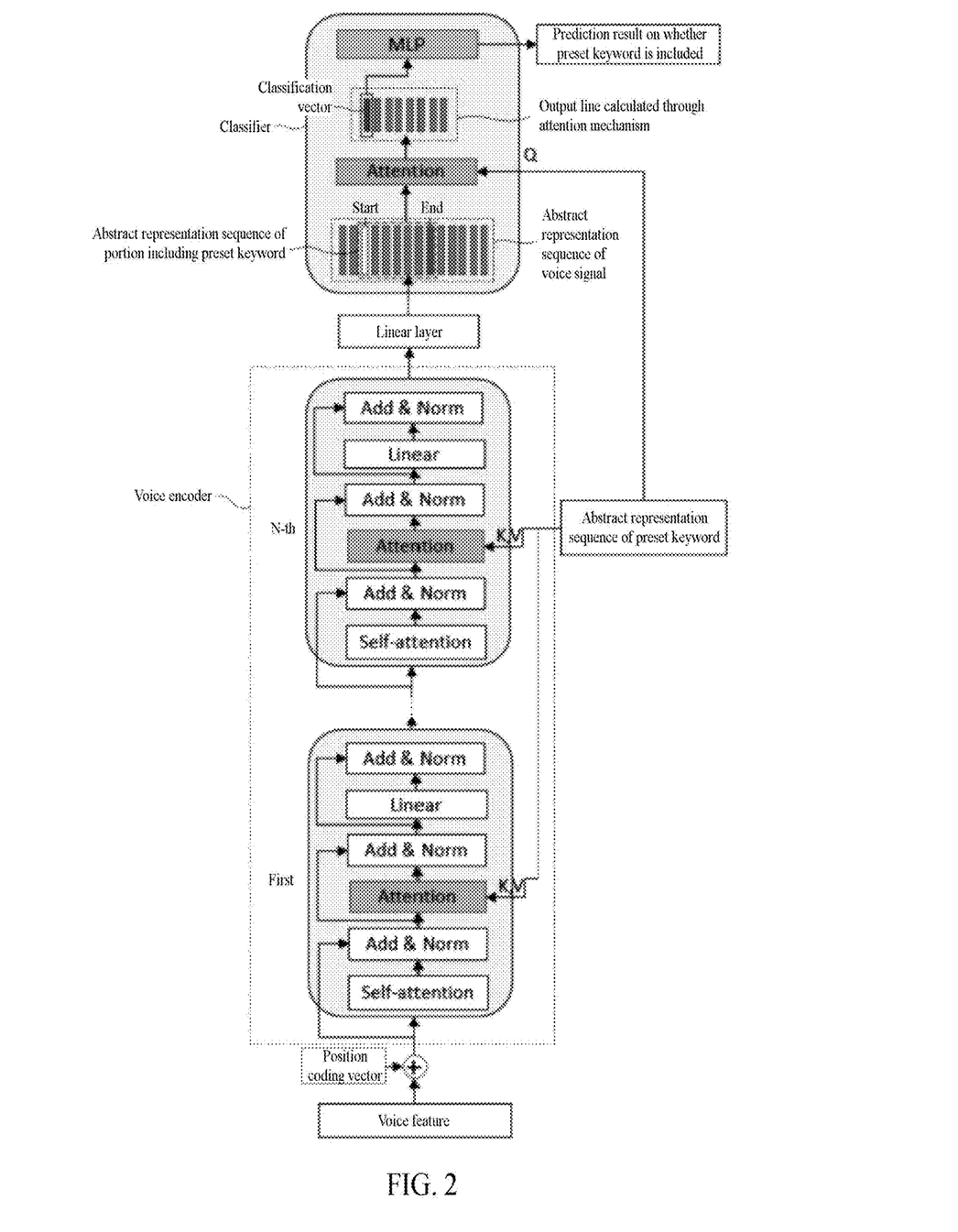
FIG. 2 illustrates an example of a keyword detection method.

For example, the voice encoder may include a plurality of submodules connected in series, and each of the submodules may strengthen the preference of a hidden layer abstract representation sequence for the preset keyword in each operation by inputting the abstract representation sequence of the preset keyword to the hidden layer abstract representation sequence of the voice signal through the attention mechanism. For example, the submodule may be a multi-head self-attention mechanism module transformer decoder block. Each output from the submodules connected in series may be an input to a next submodule, and an output from a last submodule may be an output from the entire voice encoder. Referring to FIG. 2, for example, in case the submodule is a transformer decoder module, an attention layer may combine the abstract representation sequence of the preset keyword with an output from a self-attention layer on which normalization (for example, Add & Norm) is processed, and may receive a result of normalization processing as an input to a linear layer.

Figure 3:
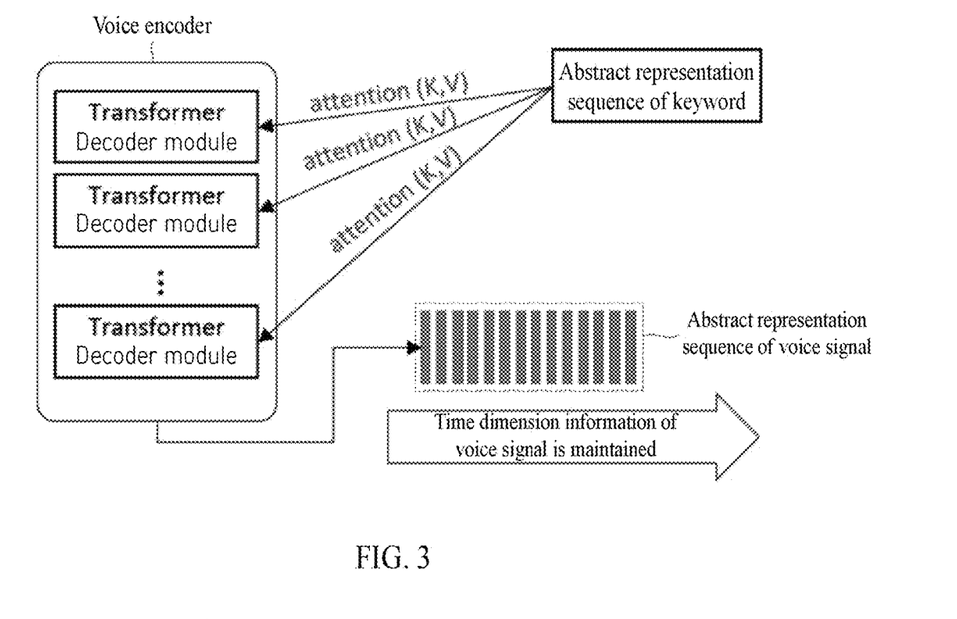
FIG. 3 illustrates an example of combining a voice feature with an abstract representation sequence of a preset keyword through an attention mechanism.

Referring to FIGS. 2 and 3, an intermediate hidden representation sequence (that is, a hidden layer representation sequence) of each of the submodules may be H, which has a form of $t_1*h$ as a query matrix of the attention mechanism. An abstract representation sequence W of the preset keyword may be used as a key matrix of the attention mechanism in a form of $t_w*h$. In general, since a value matrix is identical to the key matrix, W may be used for the value matrix. After performing the attention mechanism, the form of the intermediate hidden representation sequence may be unchanged and maintained as $t_1*h$. Thus, the voice encoder may maintain time dimension information of the voice signal to designate a subsequent position of the preset keyword.

For example, the keyword detection model may include a linear layer. The linear layer may predict position information of the preset keyword in the voice signal based on the abstract representation sequence of the voice signal. That is, the linear layer may obtain the position information for a portion in which the preset keyword may be included in the voice signal.

In an example embodiment, an operation of predicting whether the preset keyword is included in the voice signal, based on the abstract representation sequence of the voice signal and the position information may include determining an abstract representation sequence of a portion including the preset keyword in the voice signal, based on the abstract representation sequence of the voice signal and the position information, and predicting whether the preset keyword is included in the voice signal by combining the abstract representation sequence of the preset keyword with the abstract representation sequence of the portion including the preset keyword in the voice signal through the attention mechanism.

For example, the position information may include identification information of a start frame of the preset keyword in a voice sequence and identification information of an end frame of the preset keyword in the voice sequence. Accordingly, the portion including the preset keyword in the voice signal may be a portion between the start frame and the end frame of the preset keyword in the voice sequence.

For example, the keyword detection model may include a classifier, and the classifier may predict whether the preset keyword is included in the voice signal, based on the position information and the abstract representation sequence of the voice signal.

Optionally or additionally, the keyword detection model may predict whether the preset keyword is included in a portion of the voice signal input by the user by processing the voice signal in real-time. That is, without waiting for a completion of a voice signal input by the user from start to end of utterance by the user, the keyword detection model may predict whether the preset keyword is included in at least a portion of the voice signal by processing at least the portion of the voice signal input by the user in real-time.

Figure 4:
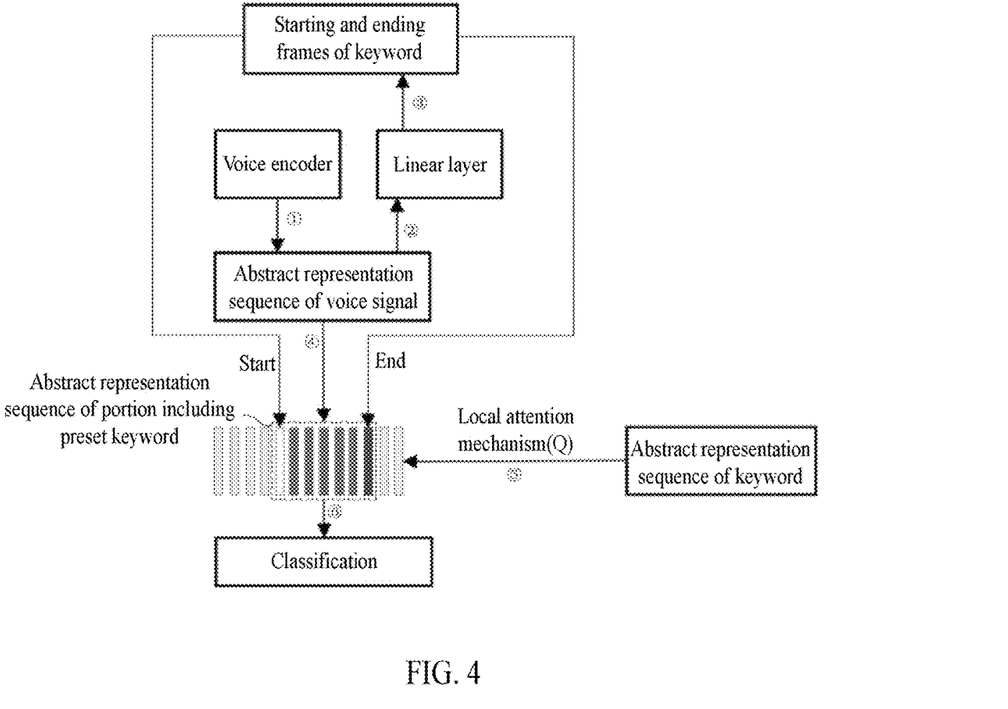
FIG. 4 illustrates an example of a keyword detection method.
Figure 5:
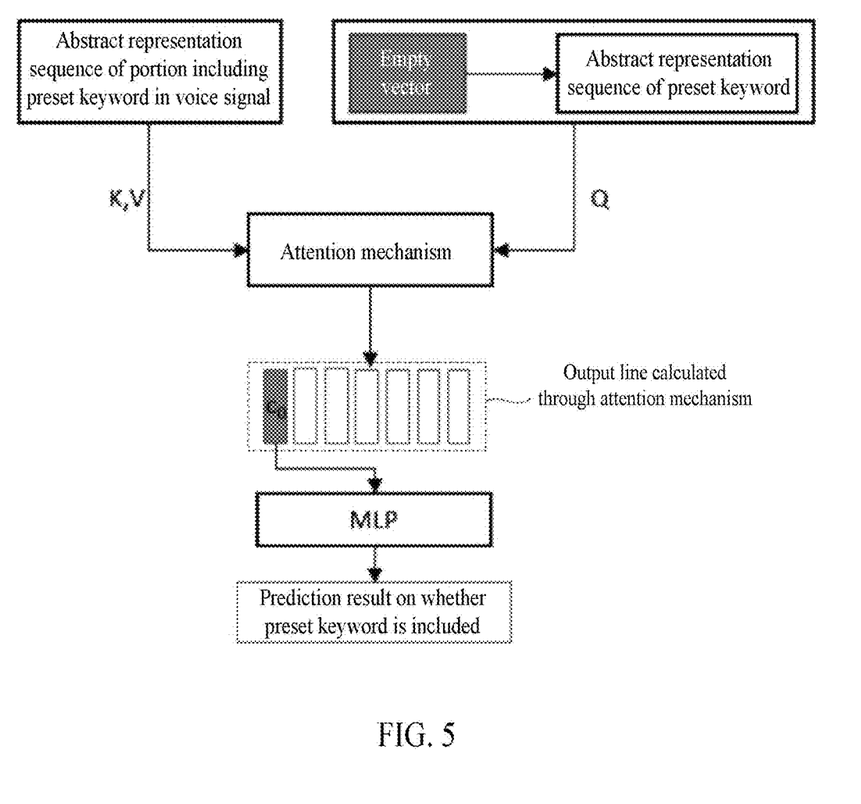
FIG. 5 illustrates an example of combining an abstract expression sequence of a preset keyword portion of a voice signal with an abstract representation sequence of a preset keyword through an attention mechanism.

FIG. 4 illustrates an example of a keyword detection method based on a local attention mechanism based on a keyword positioning result according to an example embodiment. Referring to FIG. 4, the voice encoder may calculate a phonetic classification probability of each frame (that is, a probability of various phones being included in each frame), and may also calculate a probability that a current frame is a start frame and an end frame of the preset keyword. Through this process, a frame having the greatest probability as the start frame may be selected as a start position of the preset keyword in the voice sequence and may be represented as s, and a frame having the greatest probability as the end frame may be selected as an end position of the preset keyword in the voice sequence and may be represented as e. Correspondingly, referring to FIG. 5, a sub matrix $S_h$ from s to e may be intercepted in the abstract representation sequence of the voice signal output by the voice encoder, and its form may be $t_2*h$ and $t_2=e-s$. $S_h$ may represent an abstract representation sequence including a corresponding portion of the preset keyword in the voice sequence, and may combine audio information with preset keyword information through the attention mechanism (specifically, a local attention mechanism of position navigation) again. A difference may be that an abstract representation sequence W of the preset keyword may take Q, and $S_h$ may receive K and V. Before executing the attention mechanism, since a blank line vector $C_o$ (that is, a spatial occupation vector) may be inserted before a first row vector of W, a matrix having a form of $(1+t_w)*h$ may be output after calculating by the attention mechanism. Here, a first additional row vector may be used as a classification vector, and the classification vector may predict at least one of a probability of appearance or non-appearance of the preset keyword after being converted through an MLP.

For example, the keyword detection method may further include an operation of waking-up an electronic device when the preset keyword is included in the voice signal based on a result output from the keyword detection model.

For example, the keyword detection method may further include an operation of outputting the result and the position information when the preset keyword is included in the voice signal, based on the result output from the keyword detection model.

The abstract representation sequence of the preset keyword may be generated by a pre-trained keyword encoder based on a phone sequence of the preset keyword.

Figure 6:
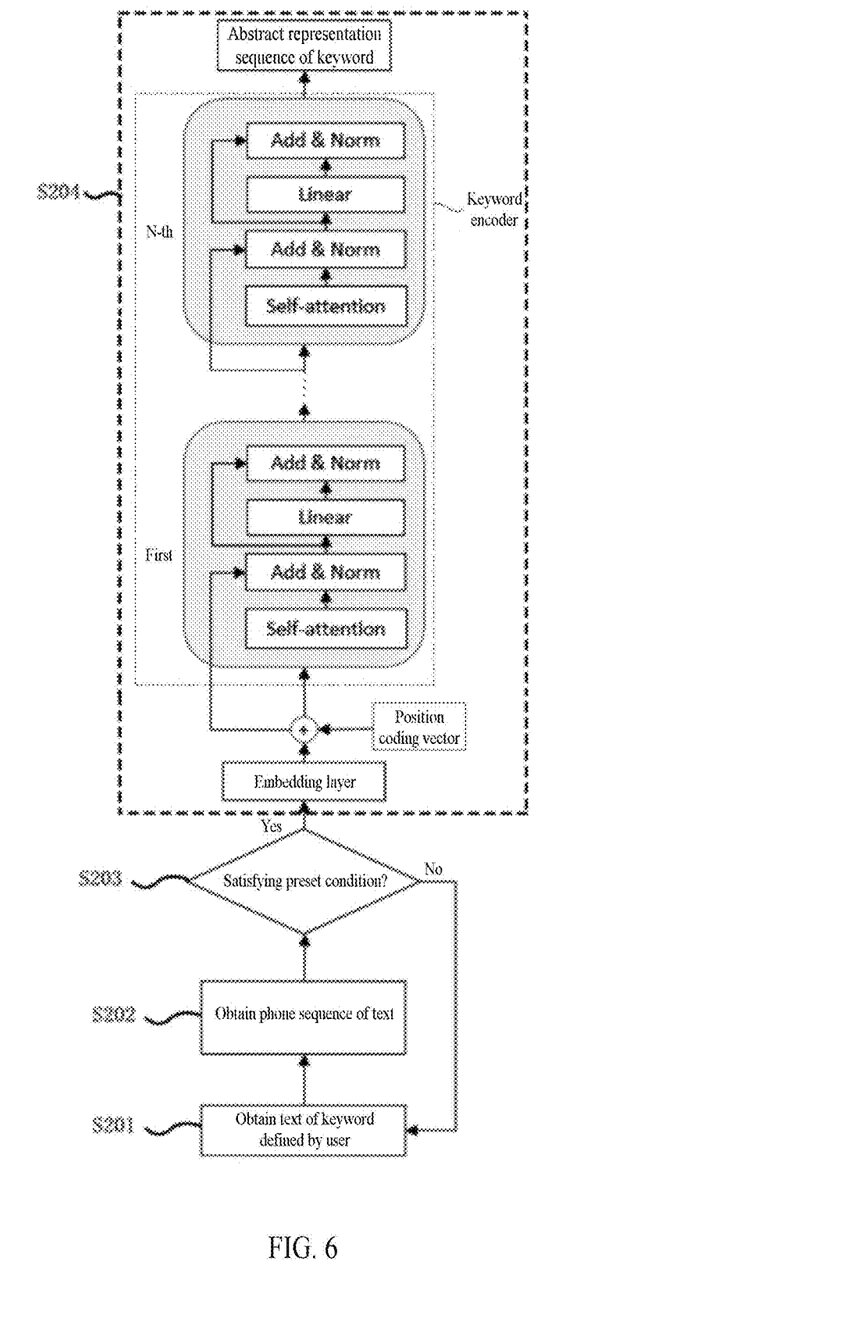
FIG. 6 is a flowchart illustrating an example of a method of generating an abstract representation sequence of a preset keyword.

FIG. 6 is a flowchart illustrating a method of generating an abstract representation sequence of a preset keyword, according to an example embodiment. The preset keyword may be a keyword defined by a user, for example, a wake-up word defined by the user, or other types of keywords may be applicable. For example, a method of generating an abstract representation sequence of a preset keyword, according to an example embodiment, may be performed by an electronic device that performs the keyword detection method illustrated with reference to FIG. 1.

Referring to FIG. 6, in operation S201, text of a keyword defined by a user may be obtained.

For example, text of a user-defined keyword input by the user may be directly received, and voice of the user-defined keyword input by the user may be converted into corresponding text.

In operation S202, a phone sequence of the text may be obtained.

For example, the phone sequence of the text may be obtained by querying a pronunciation dictionary, and the phone sequence of the text may be predicted using a grapheme to phoneme (G2P) model. For example, the phone sequence of the text may be queried by priorly querying the pronunciation dictionary, and in case of not being queried, the phone sequence of the text may be predicted using the G2P model.

In operation S203, whether the user-defined keyword satisfies a preset condition may be determined based on the text and/or the phone sequence.

For example, the preset condition may be a condition for determining whether the user-defined keyword is appropriate as a target of detection (for example, a wake-up word). For example, the preset condition may include a definable criterion by another user such as at least 5 syllables and a different word having similar pronunciation with less syllables, to minimize a probability of a detection error.

In case the user-defined keyword is determined to satisfy the preset condition in operation S203, operation S204 may be performed and an abstract representation sequence of the user-defined keyword may be obtained by inputting the phone sequence of the text to the pre-trained keyword encoder. For example, the abstract representation sequence of the user-defined keyword may be a matrix having a form of $t_w*h$. Specifically, an embedding vector may be obtained by embedding an embedding layer, and then, a combination of the embedding vector and a position coding vector may be input to the keyword encoder.

For example, the keyword encoder may be implemented in various types. For example, the keyword encoder may be one of a DNN encoder, a CNN encoder, an RNN encoder, or a transformer autoencoder, but is not limited thereto. For example, the keyword encoder may be configured based on a transformer self-attention feature extractor. For example, a transformer architecture may be used as a backbone network for implementing the voice encoder and the keyword encoder. Here, the keyword encoder may use 4 layers of a transformer encoder structure, and the voice encoder may use 6 layers of a transformer encoder structure. A specific number of layers is an example, but is not limited thereto. For example, the number of layers may be determined based on the operation capability of an actual execution device.

In addition, the abstract representation sequence of the user-defined keyword may be stored in an electronic device of the user for a subsequent call of the keyword detection model.

For example, the keyword detection model and the keyword encoder may be obtained by the electronic device from a remote server. In addition, the keyword detection model and the keyword encoder may be trained by the remote server for a typical corpus data set, and may be directly downloaded to the electronic device and used. In other words, the remote server may train the keyword detection model and the keyword encoder using the corpus data set, and may be distributed to the electronic device after training. The user may set a user-defined keyword using the keyword encoder, and the electronic device may detect the user-defined keyword in a voice signal using the keyword detection model. In a process of defining a keyword by the user and detecting the user-defined keyword using the keyword detection model, computing resources and storage resources of the electronic device may be not overly occupied and the detection accuracy may be fulfilled since an access to a network is not necessary.

The keyword detection model may be obtained by multi-objective joint training.

For example, a multi-objective may include predicting a phone sequence corresponding to the voice signal, predicting a position of the keyword in the voice signal, and predicting whether the keyword is included in the voice signal.

For example, a target function corresponding to each training objective may be set. For example, an objective loss function corresponding to an objective of predicting the position of the keyword in the voice signal may be a position loss function based on a diagonal pattern of an attention matrix.

Figure 7:
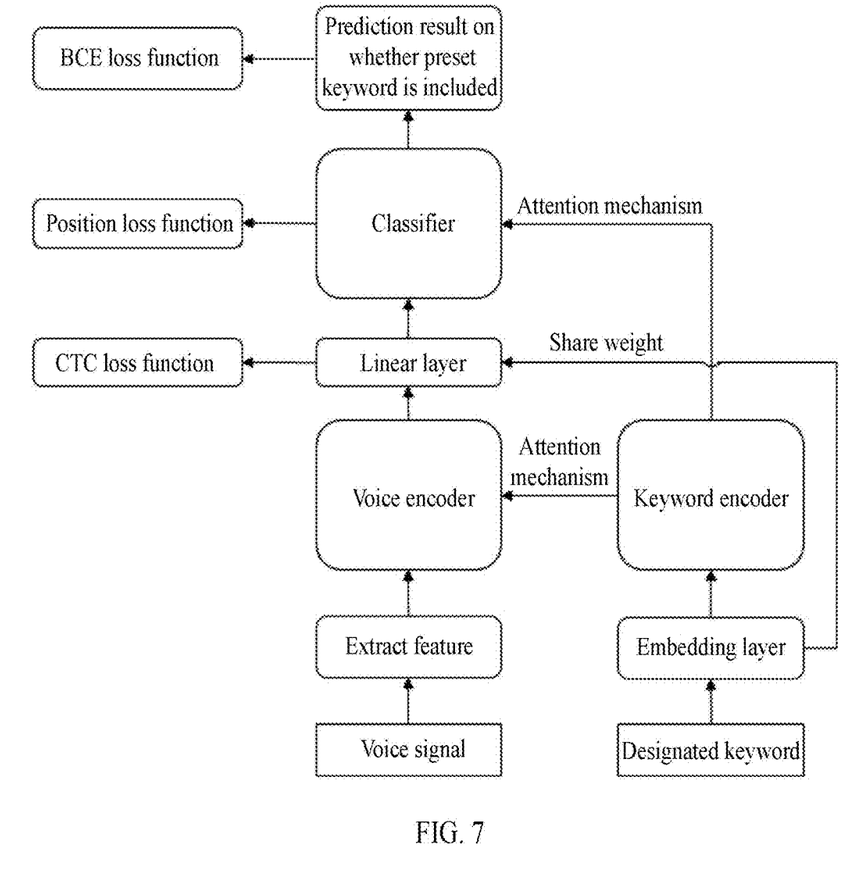
FIG. 7 illustrates an example of a training network for a keyword encoder and an end-to-end training keyword detection model.

FIG. 7 illustrates an example of a training network for a keyword detection model and a keyword encoder. For example, training of the keyword detection model and the keyword encoder may be completed in a remote server.

As shown in FIG. 7, the training network may be a multi-objective joint training network that implements end-to-end training for the keyword detection model and the keyword encoder using three different loss functions. In actual use after training is completed, the keyword detection model and the keyword encoder may be separately used. That is, the keyword detection model may be used alone when identifying whether the preset keyword is included in voice, and the keyword encoder may be used alone when the user defines the keyword or a keyword defined by a system or an application needs to be processed. This may reduce memory occupancy during actual execution time and may improve an execution speed.

The training data set may use a typical corpus, which is easily obtained compared to a specially trained detection model for a keyword (for example, a wake-up word) defined by the system or application, and may not require a plurality of voice samples for a predetermined keyword and label data aligned along a frame, which is difficult to be obtained. A training sample may be classified into a positive sample and a negative sample. For example, the positive sample and the negative sample for training may be obtained in a common corpus. Each sample may be one quadruple including voice data, transcripts text corresponding to the voice data, designated keyword text, a designated keyword, and a label representing whether the designated keyword is included in the voice. In case the designated keyword is included in the voice, the sample may be a positive sample, and in case the designated keyword is not included in the voice, the sample may be a negative sample. In case the designated keyword is included in the voice, a keyword start tag <start> and a keyword end tag <end> may be inserted before and after transcripts text of the voice including the corresponding preset keyword. For example, in a training input group, in case transcripts text of voice is "Hi Freeman call my wife", and a preset keyword is "Freeman", transcripts text of an input training network may be modified to "Hi <start> Freeman <end> call my wife". In case of the typical corpus data set such as Librispeech data set, a word may be randomly selected using a predetermined keyword in each transcripts text, and since <start> and <end> marks may be inserted as a positive sample after and before the word in the corresponding transcripts text, the transcripts text may generate a plurality of positive samples. In a typical corpus data set dictionary, a word, which is not included in a currently transcribed text, may be randomly selected as the designated keyword. Since the transcribed text and the selected designated keyword form a negative sample, the transcripts text may generate a plurality of negative samples. In addition, a volume of balanced positive and negative samples may be approximately equal.

A first objective of training may be causing the voice encoder to predict a phone sequence corresponding to an audio input as accurate as possible. For example, a used objective loss function may be a connectionist temporal classification (CTC) loss. A voice sequence x with a length of T may be input and an output by the voice encoder may be $O=o_1, o_2, \ldots, o_T$, and $o_t \in R^N$, where $o_t^n$ may denote a probability that a phoneme of the t-th frame of the voice data is predicted to be n. CTC may be inserted to a phone tag sequence y using an additional empty output ø, and in case a phoneme character set is L, a CTC output character set may be $L'=L \cup \{ø\}$, where a size of L' may be N. By receiving a phoneme $\pi_t$ for each frame of an output of "O" by the voice encoder, a phoneme path $\pi$ with a length of T may be formed, and the probability may be $p(\pi|x)=\prod_{t=1}^{T} o_t^{\pi_t}$. In case many-to-one mapping is defined as $B(\pi)=I$, 1 may be a sequence after removing an empty output ø and a continuous iterative output from a sequence $\pi$ such as B("xøøyzø")="xyz". Then, in case an audio input x is given, a conditional probability $p(y|x)=\Sigma_{\pi \in B^{-1}(y)} p(\pi|x)$ that an output is a tag sequence y may be predicted, and through this, a CTC loss may be defined as $CTC(x)=-\log p(y|x)$.

A second objective of the training may be to combine audio information with keyword information through two performances of attention mechanisms. After inputting an output of the keyword encoder to the voice encoder, a position of the preset keyword may be found in input audio. The loss function may be a location loss function. By inputting a keyword sequence, the keyword encoder may output a matrix W having a form of $T_w*h$. An abstract representation sequence of the voice having a form of $T*h$ may be obtained by inputting a voice sequence with a length of T and coding a first keyword attention. Then, based on a following H, the voice encoder may output $O=o_1, o_2, \ldots, o_T$, and $o_t \in R^N$. $o_t^s$ may be used to represent a probability that a t-th frame of the voice data predicts a phoneme, which is <start> tag, and $o_t^e$ may be used to represent a probability that the t-th frame of the voice data predicts a phoneme, which is <end> tag, $o_t^s$ may represent a maximum value in the $t_s$ frame, and $o_t^e$ may represent a maximum value in the $t_e$ frame. By intercepting an abstract representation sequence $S_h$ of voice corresponding to output $o_t$ between $t_s$ and $t_e$ and setting as $T_h=t_e-t_s$, a form of $S_h$ may be $T_h*h$. Then, attention coding may be performed using W output by the keyword encoder, and an attention weight output $$A = \text{softmax}\left(\frac{F(W, S_h)}{\sqrt{h}}\right)$$

may be a matrix of $T_w*T_h$. In case of the positive sample, W representing keyword text information and $S_h$ representing keyword voice information may match, and a diagonal pattern may be observed in an attention weight matrix A; however, in the negative sample, the pattern should not be observed. The present disclosure may adopt a location loss function based on a diagonal pattern of an attention matrix to strengthen the pattern for achieving more accurate keyword positioning.

$$\text{Loss}_{location}(A) = \begin{cases} \text{mean}(\text{sum}(A \odot M, \text{dim} = 1), \text{positive sample} \\ 1 - \text{mean}(\text{sum}(A \odot M, \text{dim} = 1), \text{negative sample} \end{cases}$$

Here, a matrix size of a mask matrix M may be identical to A, *h, and $$M(i, j) = 1 - e^{-\frac{(\frac{i}{w} - \frac{j}{h})^2}{2\sigma^2}}.$$

A definition of M may reflect a local diagonal pattern based on gaussian distribution, and a may be a hyper-parameter, where $\sigma>0$, and may control a tolerance error of the diagonal pattern. As a value decreases, a diagonal may be sharper, and a match limitation on a keyword and voice corresponding to the keyword may increase. By adopting a restriction of the location loss function based on the diagonal pattern of the attention weight, a position of the preset keyword in voice data may be efficiently and accurately found.

A third objective of the training may be to demand the keyword detection model to classify the positive sample and the negative sample as accurate as possible. As stated above, the first row vector output by the second attention coding may be used as a classification vector, and may be optimized by using a binary classification objective loss function after MLP conversion. The loss function may be a mean squared error (MSE) loss function, a categorical cross entropy (CCE) loss function, or a binary cross entropy (BCE) loss function.

In a training process, model parameters of the keyword encoder and the keyword detection model may be adjusted by comprehensively considering results obtained by the three loss functions. For example, model parameters of the voice encoder, the linear layer, the classifier, and the keyword encoder may be adjusted. For example, a total loss function may be $\lambda_1*(\text{CTC loss})+\lambda_2*(\text{Location loss})+\lambda_3*(\text{Classification loss})$. This may secure global optimization of an end-to-end keyword detection model and keyword encoder, and by implementing global optimization through the training, the detection accuracy may be improved and an optimization problem in local and a risk of quality degradation in an intermediate feature due to step-by-step learning may be prevented.

For example, various training methods may be used and by priorly using a typical corpus data set, a large-scale automatic speech recognition (ASR) model may be trained, and the ASR model may adopt a transformer architecture. Here, a transformer encoder may be similar to the voice encoder that removes the attention layer, and the transformer decoder may be similar to the keyword encoder that adds the attention layer thereto in the present disclosure. Then, the voice encoder and the keyword encoder may be trained based on the pre-trained ASR model. Then, the entire network, that is, the keyword detection model and the keyword encoder, may be simultaneously trained end-to-end using positive and negative samples having keywords and position markers generated in the typical corpus data set. For example, a keyword detection network with a small number of parameters, including the keyword detection model and the keyword encoder, may be designed, and by simultaneously training with a small network by detecting pre-trained large-scale keywords as a teacher using a teacher-student training method, network parameters may be reduced based on an assumption that the prediction accuracy is maintained.

In addition, for example, since a linear layer after the voice encoder and an embedding layer (a phoneme embedding layer) before the keyword encoder may have the same abstract representation dimension, a network weight may be shared, and network parameters may further be reduced.

In a typical method, a model may be trained for a keyword determined by a system or an application in general. Thus, only the keyword determined by the system or the application is accurately identified, and accurate identification of a user-defined keyword may not be supported. In a case where a user wants to define a keyword directly, the keyword may need to be uploaded to a remote server. Then, after an engineer redevelops or modifies a model program based on the user-defined keyword, the user may download and use this. However, this may cause privacy problems, high labor costs, and waste in time and labor. In contrast, one or more embodiments of the present disclosure may completely implement a user-defined keyword and a keyword detection process in local without a need to modify a corresponding program to a special training model for the user-defined keyword, and may have high detection accuracy.

Figure 8:
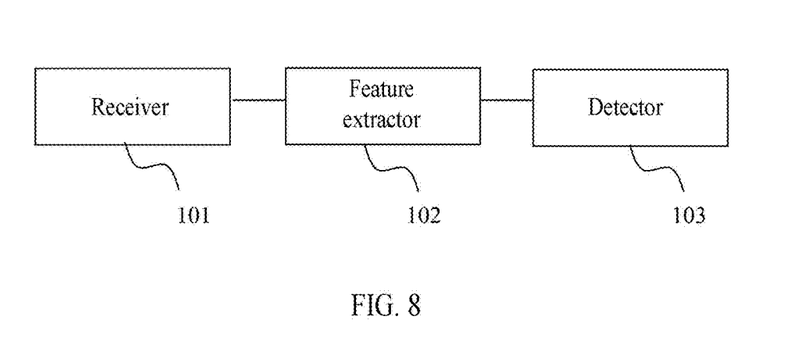
FIG. 8 illustrates an example of a keyword detection apparatus.

FIG. 8 illustrates an example of a keyword detection apparatus according to an example embodiment.

As shown in FIG. 8, the keyword detection apparatus may include a receiver 101, a feature extractor 102, and a detector 103.

The receiver 101 may be used to receive a voice signal input by a user.

The feature extractor 102 may be used to extract a voice feature of the voice signal.

The detector 103 may be used to input an abstract representation sequence of a preset keyword and the voice feature to an end-to-end keyword detection model, and to obtain a result on whether the preset keyword is included in the voice signal.

Here, the keyword detection model may predict whether the preset keyword is included in the voice signal by obtaining an abstract representation sequence of the voice signal, based on the voice feature and an abstract representation sequence of the preset keyword; predicting position information of the preset keyword in the voice signal based on the abstract representation sequence of the voice signal; and predicting whether the preset keyword is included in the voice signal, based on the abstract representation sequence of the voice signal and the position information.

For example, the preset keyword may include the user-defined keyword.

For example, a process of obtaining the abstract representation sequence of the voice signal, based on the voice feature and the abstract representation sequence of the preset keyword may include an operation of obtaining the abstract representation sequence of the voice signal by combining the voice feature with the abstract representation sequence of the preset keyword through an attention mechanism.

For example, a process of predicting whether the preset keyword is included in the voice signal, based on the abstract representation sequence of the voice signal and the position information, may include an operation of determining an abstract representation sequence of a portion in which the preset keyword is included in the voice signal, based on the abstract representation sequence of the voice signal and the position information; and an operation of predicting whether the preset keyword is included in the voice signal by combining the abstract representation sequence of the portion in which the preset keyword is included in the voice signal with the abstract representation sequence of the preset keyword through the attention mechanism.

For example, the keyword detection model may include the voice encoder used for predicting the abstract representation sequence of the voice signal, and here, the voice encoder may include a plurality of sub modules connected in series, and each of the sub modules may input the abstract representation sequence of the preset keyword to a hidden layer abstract representation sequence of the voice signal.

The abstract representation sequence of the preset keyword may be generated by a pre-trained keyword encoder based on a phone sequence of the preset keyword.

For example, the keyword detection model may be obtained by multi-objective joint training.

For example, the multi-objective may include predicting a phone sequence corresponding to the voice signal, predicting a position of the keyword in the voice signal, and predicting whether the keyword is included in the voice signal.

For example, a target loss function corresponding to an object of predicting the position of the keyword in the voice signal may be a location loss function based on a diagonal pattern of an attention matrix.

For example, the apparatus may be an electronic device, the keyword detection model may be obtained by the electronic device from a remote server, and here, the keyword detection model may be trained for a typical corpus data set by the remote server.

For example, the keyword detection apparatus may further include a wake-up unit (not shown) and/or an output unit (not shown).

The wake-up unit may be used to wake-up a current electronic device in case the preset keyword is included in the voice signal based on a result output by the keyword detection model.

The output unit may be used to output the result and the position information in case the preset keyword is included in the voice signal based on the result output by the keyword detection model.

Optionally, the keyword detection model may predict whether the preset keyword is included in a portion of the voice signal input by the user by processing the voice signal in real-time. That is, without waiting for a completion of a voice signal input by the user from a start to an end of utterance by the user, the keyword detection model may predict whether the preset keyword is included in at least a portion of the voice signal.

It should be understood that a detailed processing performed by the keyword detection apparatus according to an example embodiment is described with reference to FIGS. 1 to 7, and a repeated description related thereto is omitted.

The examples described herein may be implemented using hardware components, software components, and/or combinations thereof. Those skilled in the art may implement each unit/module using a field-programmable gate array (FPGA) or an application-specific integrated circuit (ASIC), for example, according to the processing performed by each defined unit.

According to another example embodiment, a computer-readable storage medium may be provided to store a computing program and to implement a quantization method for a deep learning model when the computing program is executed.

Specifically, the keyword detection method according to an example embodiment may be implemented by computer program instructions recorded in the computer-readable storage medium, and the computer program instructions may implement the method when executed by a processor or other types of computing device. The computer-readable storage medium may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The devices described above may be configured to act as one or more software modules in order to perform the operations and methods of the example embodiments described above, or vice versa. In addition, the computer-readable storage medium may be distributed to network-coupled computer systems, so that computer-readable code or program instructions may be stored and executed in a distribution fashion.

The keyword detection apparatus may include at least one processor and at least one memory to store computer-executable instructions, and when the computer-executable instructions are executed by the processor, the apparatus may control the processor to execute at least one of the quantization methods for deep learning model.

Specifically, the keyword detection apparatus may be a tablet computer, a smartphone, a smartwatch, or other electronic devices having required computing and/or processing ability. The electronic device may include a processor connected via a system bus, a memory, a network interface, and a communication interface. A processor of the electronic device may be used to provide required computing, processing, and/or control functions. A memory of the electronic device may include a non-volatile storage medium. The non-volatile storage medium may store an operating system, a computer program, and the like. The memory may provide an operating system of the non-volatile storage medium and an environment for an operation of the computer program. The network interface and communication interface of the electronic device may be used to connect and communicate with an external device via networks.

Figure 9:
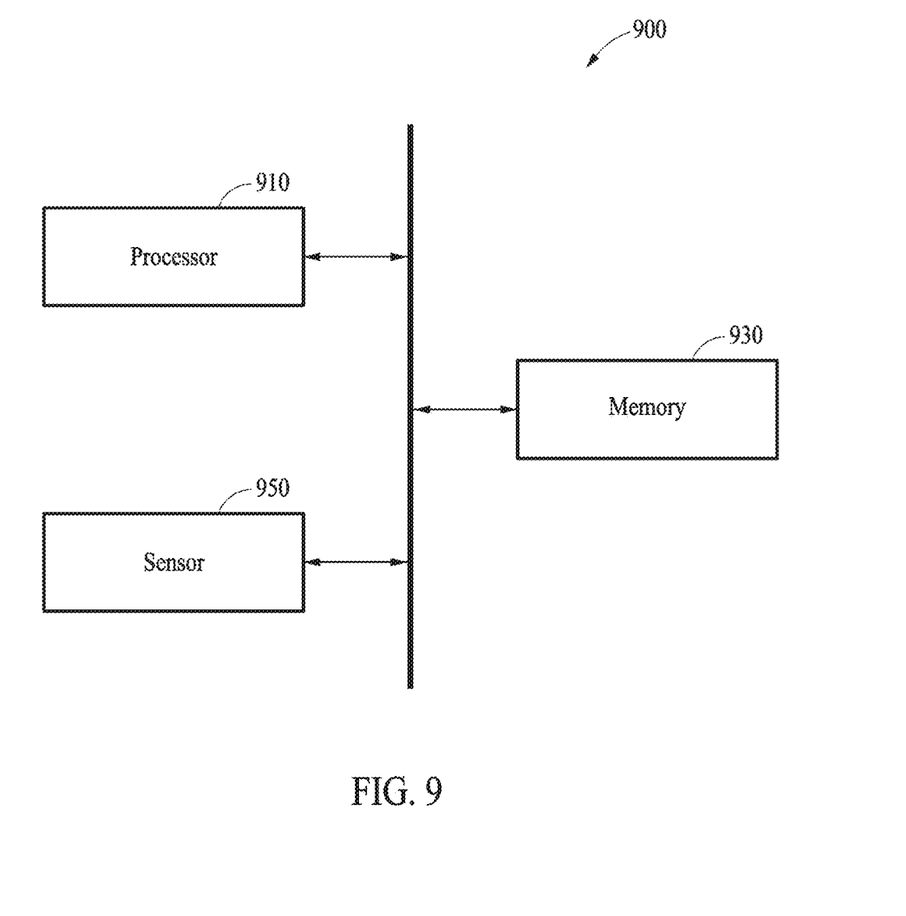
FIG. 9 illustrates an example of an electronic apparatus.

FIG. 9 illustrates an example of an electronic apparatus.

Referring to FIG. 9, an electronic apparatus 900 may be or a include keyword detection apparatus (for example, the keyword detection apparatus of FIG. 8), as a non-limiting example. The electronic apparatus 900 may be configured to perform one or more or all steps, operations, or methods described above with reference to FIGS. 1 through 8.

The electronic apparatus 900 may be a computing device. The electronic apparatus 900 may be, for example, a personal computer (PC), an advanced driver assistance system (ADAS), a head-up display (HUD) device, a camera, a 3D digital information display (DID), a navigation device, a neuromorphic device, a 3D mobile device, a smartphone, a smart television (TV), a smart vehicle, an internet of things (IoT) device, a medical device, or the like. The 3D mobile device may include, for example, a display device configured to display AR, virtual reality (VR), and/or mixed reality (MR), a head-mounted display (HMD), a face-mounted display (FMD), and AR glasses.

The electronic apparatus 900 may include a processor 910 (e.g., one or more processors), a memory 930 (e.g., one or more memories), and a sensor 950 (e.g., one or more sensors). These components of the electronic apparatus 900 may communicate with one another through a communication bus 905.

The processor 910 may control an overall operation of the electronic apparatus 900 and implement operations or methods by execution of instructions stored in the memory 930. The processor 910 may include the feature extractor 102 and the detector 103 of FIG. 8, described above, as a non-limiting example. The processor 910 may be configured to perform one or more or all steps, operations, or methods described above with reference to FIGS. 1 through 8. For example, the processor 910 may predict whether a preset keyword is present in a voice signal, based on an abstract representation sequence of the voice signal and position information.

The memory 930 may store information used by the processor 910 to perform operations. For example, the memory 930 may store instructions, which when executed by the processor 910, configure the processor to perform one or more or all steps, operations, or methods described above with reference to FIGS. 1 through 8, as well as related information for the execution of other functions or other applications of the electronic apparatus 900. The memory 930 may include, as a memory, an RAM, a DRAM, an SRAM, and other types of nonvolatile memory that are known in the related technical field. In addition, the memory 930 may be a computer-readable storage medium or device, such as, for example, a storage, a magnetic hard disk, an optical disc, a flash memory device, and the like.

The sensor 950 may be or include the receiver 101 of FIG. 8, in an example. For example, the sensor 950 may include a microphone that converts a sound of a user to receive a voice signal of the user.

The keyword detection apparatuses, receivers, feature extractors, detectors, electronic apparatuses, processors, memories, sensors, communication buses, receiver 101, feature extractor 102, detector 103, electronic apparatus 900, processor 910, memory 930, sensor 950, communication bus 905, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with keyword detection, the method comprising:
   receiving at least a portion of a voice signal input by a user;
   extracting a voice feature of the voice signal;
   inputting an abstract representation sequence of a preset keyword and the voice feature to an end-to-end keyword detection model; and determining a result on whether the preset keyword is present in the voice signal output from the keyword detection model, wherein the keyword detection model predicts whether the preset keyword is present in the voice signal by:

determining an abstract representation sequence of the voice signal, based on the voice feature and the abstract representation sequence of the preset keyword;

predicting position information of the preset keyword in the voice signal based on the abstract representation sequence of the voice signal; and predicting whether the preset keyword is present in the voice signal, based on the abstract representation sequence of the voice signal and the position information.

2. The method of claim 1, wherein the keyword detection method is performed in real-time for at least a portion of the voice signal input by the user.

3. The method of claim 1, wherein the preset keyword comprises either one or both of a keyword defined by the user and a preset keyword preset by a system or an application.

4. The method of claim 1, wherein the determining of the abstract representation sequence of the voice signal, based on the voice feature and the abstract representation sequence of the preset keyword comprises determining the abstract representation sequence of the voice signal by combining the voice feature with the abstract representation sequence of the preset keyword through an attention mechanism.

5. The method of claim 1, wherein the predicting of whether the preset keyword is present in the voice signal, based on the abstract representation sequence of the voice signal and the position information comprises:

determining an abstract representation sequence of a portion comprising the preset keyword in the voice signal, based on the abstract representation sequence of the voice signal and the position information; and predicting whether the preset keyword is present in the voice signal by combining the abstract representation sequence of the preset keyword with the abstract representation sequence of the portion comprising the preset keyword in the voice signal through an attention mechanism.

6. The method of claim 4, wherein the keyword detection model comprises a voice encoder used for predicting an abstract representation sequence of a voice signal, the voice encoder comprises a plurality of submodules connected in series, and each of the submodules inputs the abstract representation sequence of the preset keyword to a hidden layer abstract representation sequence of the voice signal through the attention mechanism.

7. The method of claim 1, wherein the abstract representation sequence of the preset keyword is generated by a pre-trained keyword encoder based on a phone sequence of the preset keyword.

8. The method of claim 1, wherein the keyword detection model is determined by multi-objective joint training, and a multi-objective comprises predicting a phone sequence corresponding to the voice signal, predicting a position of a keyword in the voice signal, and predicting whether the keyword is present in the voice signal.

9. The method of claim 8, wherein an objective loss function corresponding to an object for predicting the position of the keyword in the voice signal is based on a diagonal pattern of an attention matrix.

10. The method of claim 1, further comprising either one or both of:

waking up a current electronic device in response to the result output from the keyword detection model indicating that the preset keyword is present in the voice signal; and outputting the result and the position information.

11. A non-transitory computer-readable storage medium storing instructions that, when executed by one or more processors, configure the one or more processors to perform the method of claim 1.

12. An apparatus with keyword detection, the apparatus comprising:

one or more processors; and a memory storing instructions that, when executed by the one or more processors, configure the one or more processors to perform the method of claim 1.

13. An apparatus with keyword detection, the apparatus comprising:

a receiver configured to receive at least a portion of a voice signal input by a user;

one or more processors configured to:

extract a voice feature of the voice signal; and input an abstract representation sequence of a preset keyword and the voice feature to an end-to-end keyword detection model; and determine a result on whether the preset keyword is present in the voice signal output from the keyword detection model, wherein the keyword detection model predicts whether the preset keyword is present in the voice signal by:

determining an abstract representation sequence of the voice signal, based on the voice feature and the abstract representation sequence of the preset keyword;

predicting position information of the preset keyword in the voice signal based on the abstract representation sequence of the voice signal; and predicting whether the preset keyword is present in the voice signal, based on the abstract representation sequence of the voice signal and the position information.

14. The apparatus of claim 11, wherein the keyword detection apparatus processes at least a portion of the voice signal input by the user in real-time.

15. The apparatus of claim 11, wherein, for the determining of the abstract representation sequence of the voice signal, the one or more processors are configured to determine the abstract representation sequence of the voice signal by combining the voice feature with the abstract representation sequence of the preset keyword through an attention mechanism.

16. The apparatus of claim 11, wherein the predicting of whether the preset keyword is present in the voice signal based on the abstract representation sequence of the voice signal and the position information comprises:

determining an abstract representation sequence of a portion comprising the preset keyword in the voice signal based on the abstract representation sequence of the voice signal and the position information; and predicting whether the preset keyword is present in the voice signal by combining the abstract representation sequence of the preset keyword with the abstract representation sequence of the portion comprising the preset keyword in the voice signal through an attention mechanism.

17. A processor-implemented method with keyword detection, the method comprising:

determining text of a keyword;

determining a phone sequence of the text;

determining whether the keyword satisfies a preset condition based on either one or both of the text and the phone sequence;

inputting, in response to the keyword satisfying the preset condition, the phone sequence to a pre-trained keyword encoder;

generating an abstract representation sequence of the keyword from the pre-trained keyword encoder, wherein the determining of whether the keyword satisfies the preset condition comprises determining whether a number of syllables of the text is greater than or equal to a predetermined number.

18. The method of claim 17, further comprising:

receiving at least a portion of a voice signal input by a user;

extracting a voice feature of the voice signal; and inputting the abstract representation sequence of the keyword and the voice feature to an end-to-end keyword detection model; and determining a result on whether the keyword is present in the voice signal output from the keyword detection model.

19. The method of claim 17, wherein the text of the keyword is input by a user.

* * * * *